United States Patent

Couture

[11] Patent Number: 5,842,710
[45] Date of Patent: Dec. 1, 1998

[54] COUPLING DEVICE FOR BICYCLES

[75] Inventor: France Couture, 2526, Place Bureau, Fleurimont, Quebec, Canada, J1G 3Y2

[73] Assignee: France Couture, Sherbrooke, Canada

[21] Appl. No.: 703,374

[22] Filed: Aug. 26, 1996

[51] Int. Cl.$^6$ .................................................. B62K 27/00
[52] U.S. Cl. ........................ 280/204; 280/231; 280/292
[58] Field of Search ................................... 280/204, 292, 280/231, 222, 209, 239, 288.4

[56] References Cited

U.S. PATENT DOCUMENTS

| 658,406 | 9/1900 | Straub | 280/204 |
|---|---|---|---|
| 5,067,738 | 11/1991 | O'Connor | 280/232 |
| 5,454,578 | 10/1995 | Neack | 280/204 |
| 5,470,088 | 11/1995 | Adams | 280/204 |

FOREIGN PATENT DOCUMENTS

| 438701 | 3/1912 | France | 280/204 |
|---|---|---|---|
| 310143 | 7/1933 | Italy | 280/204 |
| 101071 | 3/1941 | Sweden | 280/292 |
| 110030 | 5/1925 | Switzerland | 280/204 |
| 1756196 | 8/1992 | U.S.S.R. | 280/204 |

Primary Examiner—Anne Marie Boehler

[57] ABSTRACT

A coupling device for coupling a second bicycle to a first bicycle, both the bicycles having front and rear wheels mounted on corresponding axles, both the bicycles also having a bicycle frame, each of the bicycle frames including a seat post, a handle bar, a forked yoke, a pair of rear axle supporting plates and a head tube. The coupling device includes a linking bar, a first bicycle attachment component for pivotally attaching the linking bar to the first bicycle; a second bicycle attachment component for pivotally attaching the linking bar to the second bicycle. One of the main features of the device is a wheel supporting component for releasably supporting the front wheel of the second bicycle. Another main feature of the device is a stabilizing component for stabilizing the handlebar of the second bicycle when the linking bar is attached to the second bicycle and for supporting linking bar when the latter is not attached to the second bicycle. The stabilizing component includes a pair of stabilizing arms and a pair of stabilizing adapters, the stabilizing adapters being adapted to be attached to the rear axle supporting plates of the first bicycle. Each of the stabilizing arms is pivotally attached to the linking bar. Each of the stabilizing arm is provided with an arm attachment component adjacent the arm distal end for selectively attaching the arm distal end to the forked yoke of the second bicycle and to one of the stabilizing adapters.

6 Claims, 4 Drawing Sheets

COUPLING DEVICE FOR BICYCLES

FIELD OF THE INVENTION

The present invention relates to the field of bicycles and is particularly concerned with a device for coupling a pair of bicycles.

BACKGROUND OF THE INVENTION

Relatively recent trends towards ecological modes of transportation and towards improved fitness through exercise have led to a resurgence in the use of bicycles. There also seems to be a relatively recent trend towards group activities and more specifically towards activities performed with other members of the family unit.

It has thus become increasingly frequent for an healthy person to go for a cycling ride accompanied by a child, an elderly person or any other person having limited physical capacities.

When such a situation occurs, the bicycle ride must either be planned so as to be within the capacities of the weaker person or frequent resting periods must be planned to allow the weaker person to rest. Both options can lead to frustration since the weaker person will feel pressured to perform beyond his or her limits, the stronger person will feel restrained and both persons will be prevented from enjoying together a relatively long ride.

The prior art is replete with various types of seats for allowing a child or any other physically weaker person to passively accompany a healthy rider. Most seats are located above the rear wheel or the handlebars of the principle rider. These designs however have been known to raise the centre of gravity of the bicycle and to potentially contribute to an upset.

The prior art is also replete with various structures of bicycle trailers allowing a rider to tow one or more children. These structures are typically more expensive but offer the advantage of a lower centre of gravity and of independent rolling elements for the trailer.

The main disadvantage associated with both the seat structures and the trailer structures is that the child or other weaker person must remain passive throughout the ride. The person being carried or towed can thus rapidly become bored. The person being carried or towed also does not beneficiates from the health advantages of physical exercise.

This drawback has been recognised in U.S. Pat. No. 5,067,738 naming Richard J. O'Connor as inventor and issued Nov. 26, 1991. U.S. Pat. No. 5,067,738 teaches a single wheeled trailer for carrying an occupant. The frame of the trailer includes tow bar members and two symmetrical fork members for retaining the single wheel. A hitch connected to a driving bicycle tows the trailer. A pedal assembly coupled to the frame enables the occupant to power the trailer wheel.

Although the structure disclosed in U.S. Pat. No. 5,067,738 enables the occupant of the trailer to either help power the bicycle or be towed by the prime mover, it suffers from at least one major drawback. Indeed, the structure does not allow the occupant of the trailer to ride independently from the prime mover even for a short period of time.

The prior art also discloses various types of towing bars for coupling two bicycles as a tandem. For example, U.S. Pat. No. 4,261,592 issued Apr. 14, 1981 and naming Jacques Busseuil as inventor discloses a coupling device wherein a coupling bar is fixed to each of a pair of bicycle by a universal joint having a specific construction. Although these structures circumvent the above-mentioned disadvantage by allowing the person to be towed to ride independently, they present still further disadvantages. First, when the bicycles are coupled, the front wheel of the bicycle being towed even though useless as a steering component still creates a frictional and a drag force that increases the load on the pulling rider.

Second, if the bicycles are eventually separated during the ride, the coupling device must be disengaged from both bicycles and carried by one of the riders, a task that is both non ergonomic and potentially dangerous.

Third, the coupling device is not well suited to coupling bicycles of different configurations and sizes as is the case when an adult bicycle is coupled to the bicycle of a child.

Accordingly, there exists a need for an improved coupling device for bicycles.

SUMMARY OF THE INVENTION

It is an object of the present invention to provide an improved coupling device for bicycles.

According to one aspect of the present invention, there is provided a coupling device for coupling a second bicycle to a first bicycle, both said bicycles having front and rear wheels mounted on corresponding axles, both said bicycles also having a bicycle frame, each of said bicycle frames including a seat post, a handle bar, a forked yoke, a pair of rear axle supporting plates and a head tube, said coupling device comprising: a linking bar, said linking bar having a generally elongated configuration defining a bar first longitudinal end and a bar second longitudinal end; a first bicycle attachment means for pivotally attaching said linking bar to said first bicycle, said first bicycle attachment means being positioned adjacent said bar first longitudinal end; a second bicycle attachment means for pivotally attaching said linking bar to said second bicycle, said second bicycle attachment means being positioned adjacent said bar second longitudinal end; a wheel supporting means for releasably supporting the front wheel of said second bicycle, said wheel supporting means being positioned intermediate said bar first longitudinal end and said bar second longitudinal end; whereby, when said device is coupling said second bicycle to said first bicycle, the front wheel of said second bicycle is removed from the latter and supported by said wheel supporting means.

Preferably, said wheel supporting means includes a wheel supporting plate secured to said linking bar; said wheel supporting plate having a plate outer peripheral edge and a plate slot extending inwardly from said plate outer peripheral edge; whereby said plate slot is adapted to receive the axle of the front wheel of said second bicycle.

Conveniently, the wheel supporting plate is positioned so as to lie in a generally horizontal plane when said coupling device is in use.

Preferably, the device further comprises a stabilizing means for stabilizing the handlebar of said second bicycle when said linking bar is attached to said second bicycle and for supporting linking bar when the latter is not attached to said second bicycle, said bar stabilizing means being mounted on said linking bar.

Conveniently, said stabilizing means includes a pair of stabilizing arms and a pair of stabilizing adapters, said stabilizing adapters being adapted to be attached to the rear axle supporting plates of said first bicycle; each of said stabilizing arms having a generally elongated configuration defining an arm proximal end and an arm distal end, each of said stabilizing arm being pivotally attached adjacent said arm proximal end to said linking bar, each of said stabilizing arm being provided with an arm attachment means adjacent said arm distal end for selectively attaching said arm distal end to the forked yoke of said second bicycle and to one of said stabilizing adapters.

Preferably, each of said arm attachment means includes at least two adjustment apertures extending through said arm distal segment, said adjustment apertures being in a spaced apart and aligned relationship relatively to one another; a stabilizing arm attachment component mounted in one of said adjustment apertures, said stabilizing arm attachment component including an attachment axle extending through said one of said adjustment apertures, a cam lever assembly mounted at a first end of said attachment axle, a nut assembly mounted at a second end of said attachment axle.

Conveniently, said linking bar defines a first bar segment, said first bar segment being adapted to extend in a generally horizontal direction and in an overlying relationship relatively to the rear wheel of said first bicycle when said device is in use; a second bar segment extending integrally from said first bar segment, said second bar segment being angle relatively to said first bar segment so as to extend substantially rearwardly and downwardly relatively to said first bar segment when said device is in use; a third bar segment extending integrally from said second bar segment, said third bar segment being angle relatively to said second bar segment so as to extend in a direction substantially parallel to said first bar segment.

Preferably, said wheel supporting means is secured to said bar first segment.

Preferably, said first attachment means includes a first bar attachment component and a first bicycle attachment component; said first bar attachment component including a first forked extension that extends integrally from said bar first longitudinal end; said first bar attachment component defining a pair of substantially parallel and spaced apart first extension tongues; said first extension tongues defining a first tongue spacing therebetween; each first extension tongue having a first tongue aperture extending therethrough; said first tongue apertures being substantially coaxially aligned along a first attachment pivoting axis; said first bicycle attachment component including a cylindrical collar and a first connecting block extending integrally and outwardly from the outer peripheral surface of said collar; said cylindrical collar being configured and sized so as to be fittingly insertable around a section of the seat post of said first bicycle; said collar having a longitudinal slot formed therein for allowing lateral insertion of said collar over said seat post; a pair of tightening lips extending integrally and outwardly from said peripheral edges of said slot ; a tightening aperture extending through each lip; said tightening apertures being adapted to receive a bolt for tightening said collar around said seat post; said first connecting block having a first block aperture extending therethrough; said first block aperture being positioned so as to be coaxially aligned with said first attachment pivoting axis when said first connecting block is positioned in said first tongue spacing; said first attachment means further comprising a first attachment component for pivotally and releasably connecting said first connecting block to said first extension tongues.

Conveniently, said first attachment component includes a first attachment axle having a cam lever assembly mounted at a first longitudinal end thereof and wherein a first attachment nut assembly having compression washers mounted therein is adapted to be threadaly attached to the second longitudinal end of said first attachment axle; said first attachment axle being adapted to be inserted through both said first block aperture and said first tongue apertures for releasably and pivotally connecting said first connecting block to said first extension tongues.

Preferably, said second attachment means includes a second bar attachment component and a second bicycle attachment component; said second bar attachment component including a second forked extension extending integrally from said bar second longitudinal end; said second bar attachment component defining a pair of substantially parallel and spaced apart second extension tongues said second extension tongues defining a second tongue therebetween; each second extension tongue having a second tongue aperture extending therethrough; said second tongue apertures being substantially coaxially aligned along a second attachment pivoting axis; said second bicycle attachment component including a clamping member and a second connecting block extending integrally and outwardly from the outer peripheral surface of said clamping member; said clamping member being configured and sized so as to be insertable around a section of the head tube of said second bicycle; said clamping member including a first clamp plate and a second clamp plate; both said first clamp plate and said second clamp plate being bent so as to define a concavity their respective inner surfaces; said concavity being configured and sized so as to fit around a portion of the head tube of a bicycle; said first clamp plate having a first plate apertures extending therethrough adjacent both of its longitudinal ends; said second clamp plate having a second plate aperture extending therethrough adjacent both of its longitudinal ends; each first plate aperture being positioned so as to be substantially coaxial with a corresponding second plate aperture when said first clamp plate is put substantially in register with said second clamp plate; each pair of pair of first plate aperture and corresponding second plate aperture being adapted to receive a clamp bolt and a corresponding clamp nut; said clamp bolts and clamp nuts being adapted to squeeze said first clamp plate and said second clamp plate around the head tube of said second bicycle; said second connecting block extending from the outer surface of said first clamp plate; said second connecting block having a second block aperture extending therethrough; said second block aperture being positioned so as to be coaxially aligned with said second attachment pivoting axis when said second connecting block is positioned in said second tongue spacing; said second attachment means further comprising a second connecting component for pivotally and releasably connecting said second connecting block to said second extension tongues.

Preferably, said second connecting component includes a second connecting axle having a cam lever assembly mounted at a first longitudinal end thereof; a second connecting nut assembly having compression washers mounted therein being threadaly attached to the second longitudinal end of said second connecting axle; said second connecting axle being adapted to be inserted through both said second block aperture and said second tongue apertures for releasably and pivotally connecting said second connecting block to said second extension tongues.

According to a second aspect of the invention, there is provided a coupling device for coupling a second bicycle to a first bicycle, both said bicycles having front and rear wheels mounted on corresponding axles, both said bicycles also having a bicycle frame, each of said bicycle frames including a seat post, a handle bar, a forked yoke, a pair of rear axle supporting plates and a head tube, said coupling device comprising: a linking bar, said linking bar having a generally elongated configuration defining a bar first longitudinal end and a bar second longitudinal end; a first bicycle attachment means for pivotally attaching said linking bar to said first bicycle, said first bicycle attachment means being positioned adjacent said bar first longitudinal end; a second bicycle attachment means for pivotally attaching said linking bar to said second bicycle, said second bicycle attachment means being positioned adjacent said bar second longitudinal end; a stabilizing means for stabilizing the handlebar of said second bicycle when said linking bar is attached to said second bicycle and for supporting linking bar when the latter is not attached to said second bicycle, said bar stabilizing means being mounted on said linking bar.

Advantages of the present invention include the fact that the coupling device not only enables the occupant of the bicycle being towed to either help power the tandem or be towed by the prime mover but also enables the occupant of the bicycle being towed to ride independently from the prime mover. A child, for example, going on a ride with a parent can thus first ride along with the parent with the bicycles uncoupled, and when the child becomes tired, the bicycles can be coupled so as to allow the child to rest.

Another advantage is that with the present invention, when a pair of bicycles are coupled, the front wheel of the bicycle being pulled is removed and passively carried by the coupling device thus reducing frictional and drag force that would otherwise create an additional load for the pulling rider. Also, since the front wheel of the bicycle being pulled is removed, the risk of that front wheel creating a turning force that could destabilise the tandem is eliminated.

A further advantage of the present invention is that the coupling device is structured so as to stabilise the handlebars of the bicycle being pulled, thus allowing the rider being pulled to use the handlebars for support.

A still further advantage of the present invention is that the device can be removed from the bicycle being pulled and still remain stably attached to the other bicycle. Thus, the bicycles can easily be uncoupled during a ride without the need for one of the riders to manually carry the coupling device. Furthermore, the coupling device can remain permanently attached to the pulling bicycle thus reducing the time required to couple the bicycles.

Other more general advantages of the present invention include the fact that the coupling device can be readily coupled to mot conventional bicycles. It can be manufactured using conventional methods of manufacturing, is relatively simple and thus economically feasible and trouble free in operation.

BRIEF DESCRIPTION OF THE DRAWINGS

An embodiment of the present invention will now be described, by way of example, in reference to the following drawings in which.

DETAILED DESCRIPTION

Figure 1:
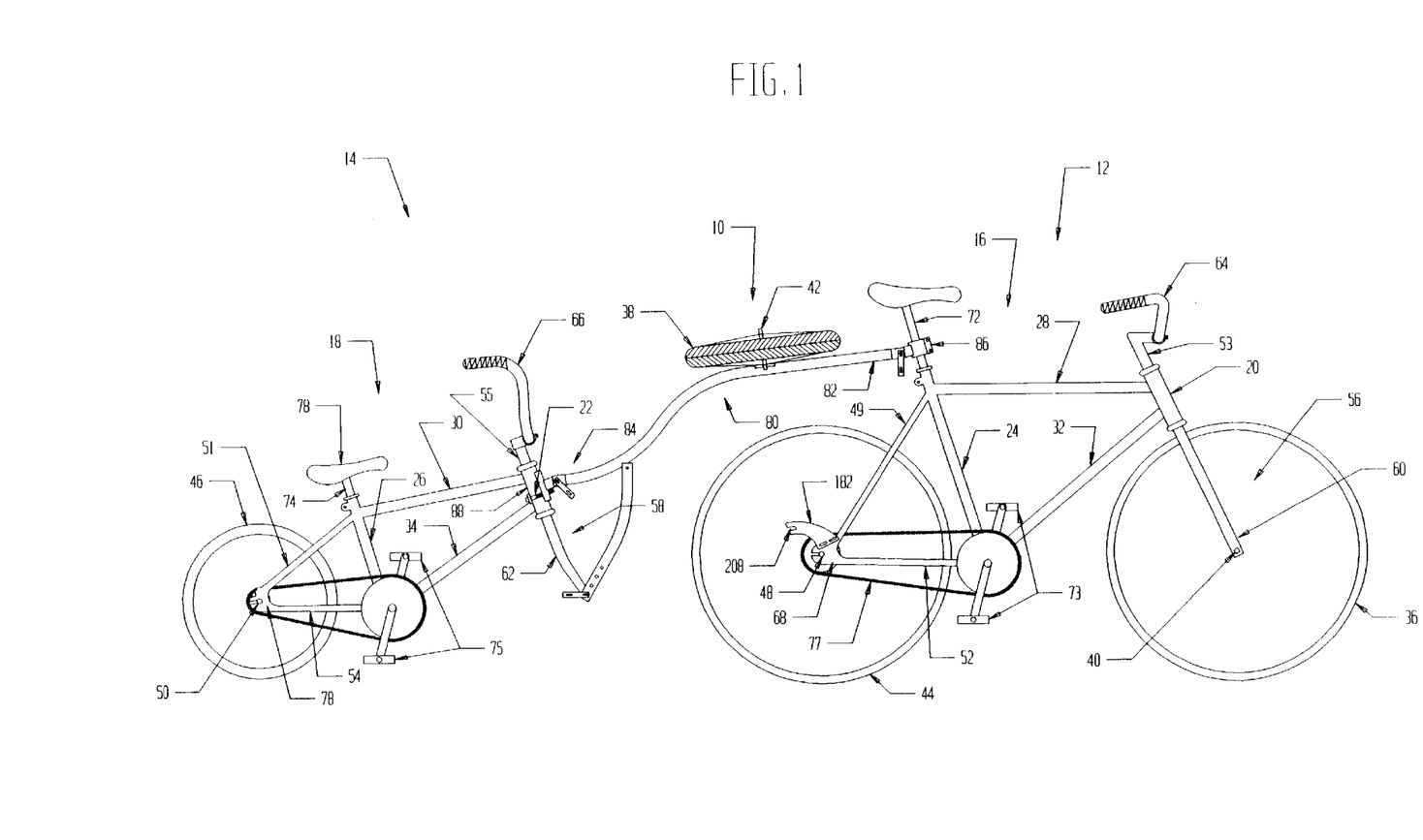
FIG. 1: in an elevational view, illustrates a coupling device in accordance with an embodiment of the present invention being used for coupling the bicycle of a child to the bicycle of an adult.

Referring to FIG. 1, there is shown a coupling device 10 in accordance with an embodiment of the present invention. The coupling device 10 is shown being used to couple a first bicycle 12 to a second bicycle 14. The first bicycle 12 is shown positioned frontwardly relatively to the second bicycle 14.

The first and second bicycles 12 and 14 are conventional bicycle. Typically, the first and second bicycles 12 and 14 respectively include first and second frames 16 and 18. The first and second frames 16 and 18 respectively include head tubes 20, 22; seat tubes 24, 26; main tubes 28, 30 and transversal tubes 32, 34.

The first and second frames 16 and 18 respectively rotatably support front wheels 36, 38 having respective front axles 40, 42. The first and second frames 16 and 18 also respectively rotatably support rear wheels 44, 46 having respective rear axles 48, 50.

A pair of seat stays 49, 51 extends substantially rearwardly and downwardly from an upper segment of the respective seat tubes 24, 26 to the respective rear axles 48, 50 on opposite sides of the rear wheels 44, 46. A pair of chain stays 52, 54 extend substantially rearwardly from a lower segment of the respective seat tubes 24, 26 to the respective rear axles 48, 50 on opposite sides of the rear wheels 44, 46.

Each respective combination of seat tubes 24, 26, seat stays 49, 51 and chain stays 52, 54 forms a pair of rear supporting structure having a substantially triangular configuration when the bicycles 12 and 14 are seen in an elevational view. The rear supporting structures are adapted to connect on opposite sides of the respective rear wheels 44, 46 into respective pairs of opposed rear axle supporting plates 68, 70. The rear supporting structures are adapted to support the rear wheels 44, 46 allowing the latter to rotate freely while supporting the rear portion of the respective frames 16 and 18.

Handlebar axles 53, 55 are respectively pivotally mounted inside the head tubes 20, 22. The handlebar axles 53, 55 respectively extend integrally into forked yokes 56, 58. Each forked yoke 56, 58 defines a corresponding pair of yoke tubes 60, 62. The yoke tubes 60, 62 have corresponding front axle receiving apertures extending therethrough adjacent a distal end thereof. The pairs of yoke tubes 60, 62 each form a front supporting structure adapted to rotatably support the front axles 40, 42 of the front wheels 36, 38. Handlebars 64, 66 are respectively secured to the handlebar axles 53, 55.

Seat posts 72, 74 are telescopically inserted into the respective seat tubes 24, 26. A corresponding pair of seats 76, 78 are respectively attached to the distal end of the seat posts 72, 74.

Drive mechanisms typically taking the form of pedals 73, 75 mechanically coupled to corresponding chain and sprocket assemblies 77, 79 are adapted to drive the respective rear wheels 44, 46.

It should be understood that first and second bicycles 12 and 14 are herein described only by way of example and that the coupling device 10 could be used with other types of bicycles without departing from the scope of the present invention.

The coupling device 10 includes a linking bar 80. As illustrated more specifically in FIG. 2, the linking bar 80 has a generally elongated configuration defining a bar first longitudinal end 82 and a bar second longitudinal end 84. The coupling device 10 also includes first and second bicycle attachment means 86 and 88 for pivotally attaching the linking bar 80 respectively to the first bicycle 12 and the second bicycle 14.

Figure 2:
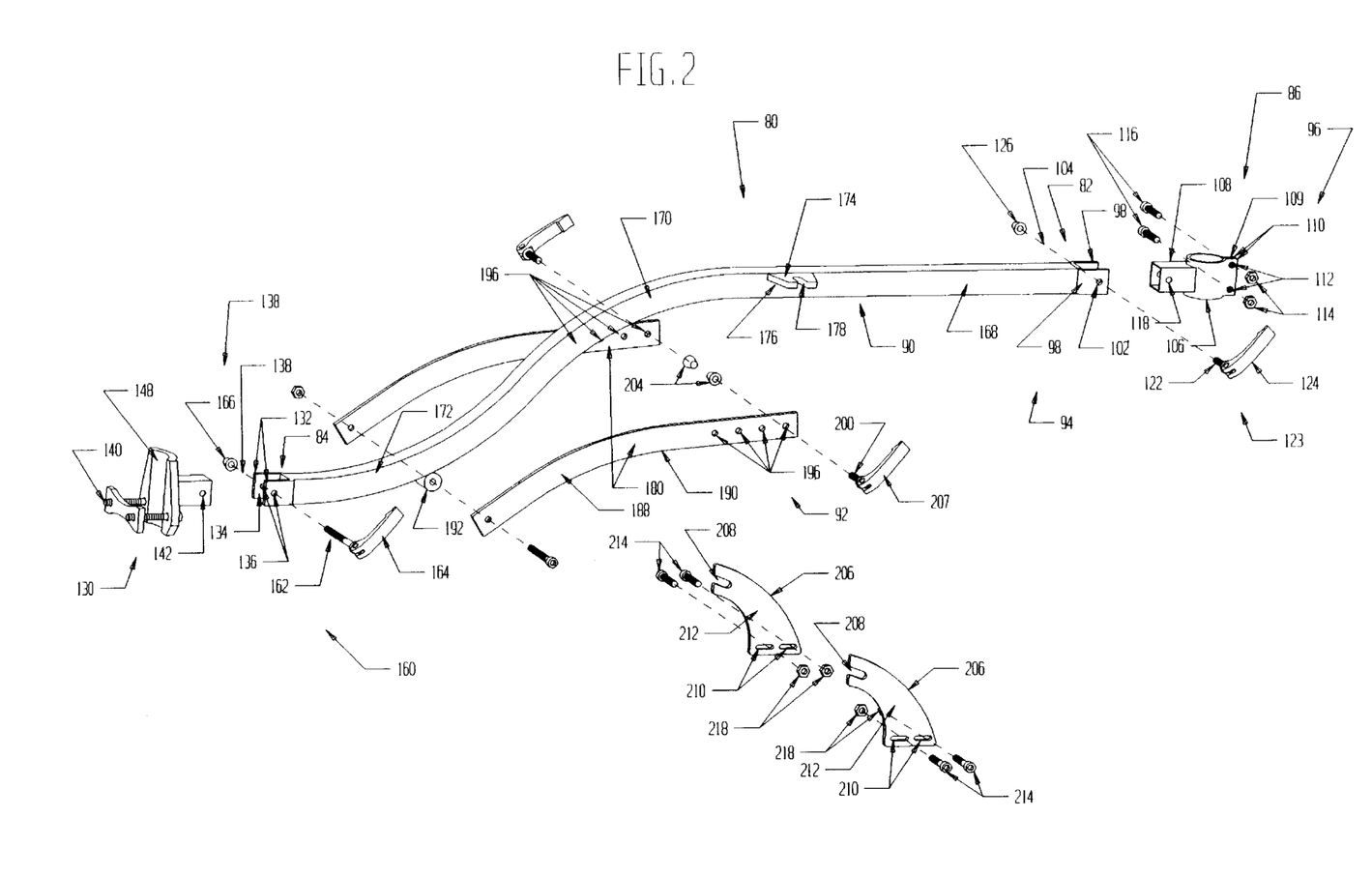
FIG. 2: in an exploded view, illustrates a coupling device in accordance with an embodiment of the present invention.

The present invention includes at least two main features. One of the main features of the present invention resides in a wheel supporting means 90 for supporting the front wheel 38 of the second bicycle 14 in an inoperative position when the device 10 is in use. Another main feature of the present invention resides in a bar stabilizing means 92 for selectively stabilizing the device 10 on the first bicycle 12 when the device 10 is not in use and on the second bicycle 14 when the device 10 is in use.

The first attachment means 86 is preferably adapted to be attached to the seat post 72 of the first bicycle 12. In the preferred embodiment, the first attachment means 86 includes a first bar attachment component 94 and a first bicycle attachment component 96.

The first bar attachment component 94 typically takes the form of a first forked extension extending integrally from the bar first longitudinal end 82. The first bar attachment component 94 defines a pair of substantially parallel and spaced apart first extension tongues 98.

The first extension tongues 98 define a first tongue spacing 100 therebetween. Each first extension tongue 98 has a first tongue aperture 102 extending therethrough. The first tongue apertures 102 are substantially coaxially aligned along a first attachment pivoting axis 104.

The first bicycle attachment component 96 includes a cylindrical collar 106 and a first connecting block 108 extending integrally and outwardly from the outer peripheral surface of the collar 106. The cylindrical collar 106 is configured and sized so as to be fittingly insertable around a section of the seat post 72 of the first bicycle 12.

As well known in the art, the collar 106 has a longitudinal slot 109 formed therein for allowing lateral insertion of the collar 106 over the seat post 72. A pair of tightening lips 110 extend integrally and outwardly from the peripheral edges of the slot 108. A tightening aperture 112 extends through each lip 110. The tightening apertures 112 are adapted to receive conventional tightening components such as the nut 114 and the bolt 116 for tightening the collar 106 around the seat post 72.

The first connecting block 108 is preferably hollow and is typically made of four relatively short plates that are connected along their longitudinal peripheral edges. The first connecting block 108 has a first block aperture 118 extending therethrough. The first block aperture 118 is positioned so as to be coaxially aligned with the first attachment pivoting axis 104 when the first connecting block 108 is positioned in the first tongue spacing 100.

A conventional quick release-type attachment component 120 is preferably used to pivotally and releasably connect the first connecting block 108 to the first extension tongues 98. The attachment component includes an first attachment axle 122 having a cam lever assembly 124 mounted at a first longitudinal end thereof.

A first connecting nut assembly 126 having conventional compression washers mounted therein is adapted to be threadaly attached to the second longitudinal end of the first attachment axle 122 as is well known in the art. The first attachment axle 122 is adapted to be inserted through both the first block aperture 118 and the first tongue apertures 102 thus releasably and pivotally connecting the first connecting block 108 to the first extension tongues 98.

Figure 3:
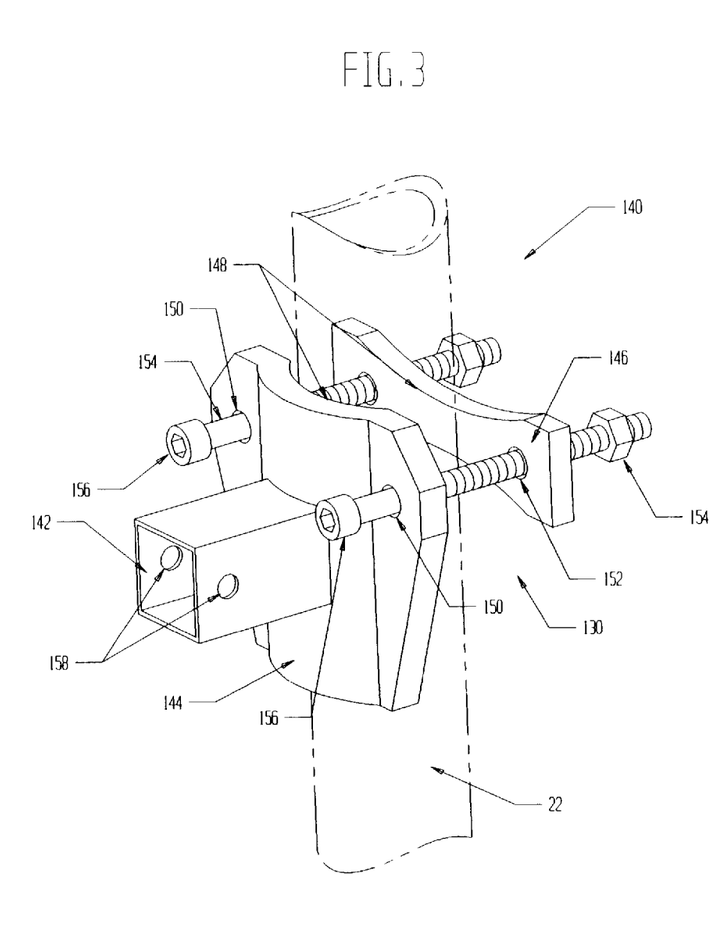
FIG. 3: in a detail view illustrates an rear attachment component part of the coupling device of FIG. 2 attached to a bicycle tube, the bicycle tube being shown in phantom lines.

As illustrated more specifically in FIGS. 2 and 3, the second attachment means 88 is preferably adapted to be attached to the head tube 22 of the second bicycle 14. In the preferred embodiment, the second attachment means 88 includes a second bar attachment component 128 and a second bicycle attachment component 130.

The second bar attachment component 128 typically takes the form of a second forked extension extending integrally from the bar second longitudinal end 84. The second bar attachment component 128 defines a pair of substantially parallel and spaced apart second extension tongues 132.

The second extension tongues 132 define a second tongue spacing 134 therebetween. Each second extension tongue 132 has a second tongue aperture 136 extending therethrough. The second tongue apertures 136 are substantially coaxially aligned along a second attachment pivoting axis 138.

The second bicycle attachment component 130 includes a clamping member 140 and a second connecting block 142 extending integrally and outwardly from the outer peripheral surface of the clamping member 140. The clamping member 140 is configured and sized so as to be insertable around a section of the head tube 22 of the second bicycle 14.

The clamping member 140 includes a first clamp plate 144 and a second clamp plate 146. Both the first clamp plate 144 and the second clamp plate 146 are bent so as to define a concavity 148 in their respective inner surfaces. The concavity 148 is configured and sized so as to fit around a portion of the head tube 22 of a conventional bicycle.

The first clamp plate 144 has a first plate apertures 150 extending therethrough adjacent both of its longitudinal ends. Similarly, the second clamp plate 146 has a second plate aperture 152 extending therethrough adjacent both of its longitudinal ends. Each first plate aperture 150 is positioned so as to be substantially coaxial with a corresponding second plate aperture 152 when the first clamp plate 144 is put substantially in register with the second clamp plate 146.

Each pair of pair of first plate aperture 150 and corresponding second plate aperture 152 is adapted to receive a clamp fastening means such as a clamp bolt 154 and a corresponding clamp nut 156. The clamp bolts 154 and clamp nuts 156 are adapted to squeeze the first clamp plate 144 and the second clamp plate 146 around the head tube 22 of the second bicycle 14.

The second connecting block 142 extends from the outer surface of the first clamp plate 144. The second connecting block 142, like the first connecting block 108 is preferably hollow and is typically made of four relatively short plates that are connected along their longitudinal peripheral edges.

The second connecting block 142 has a second block aperture 158 extending therethrough. The second block aperture 158 is positioned so as to be coaxially aligned with the second attachment pivoting axis 138 when the second connecting block 142 is positioned in the second tongue spacing 134.

A conventional quick release-type attachment component 160 is preferably used to pivotally and releasably connect the second connecting block 142 to the second extension tongues 132. The attachment component includes a second connecting axle 162 having a cam lever assembly 164 mounted at a first longitudinal end thereof.

A second connecting nut assembly 166 having conventional compression washers mounted therein is adapted to be threadaly attached to the second longitudinal end of the second connecting axle 162 as is well known in the art. The second connecting axle 162 is adapted to be inserted through both the second block aperture 158 and the second tongue apertures 136 thus releasably and pivotally connecting the second connecting block 142 to the second extension tongues 132.

Since the device 10 is adapted to be used preferably although not exclusively to attach the bicycle of a child to the bicycle of an adult, the linking bar 80 is preferably given a specific geometry adapted to at least partially compensate for the frame and wheel height differences. The lining bar 80 thus preferably has a first bar segment 168 adapted to extend in a generally horizontal direction and in an overlying relationship relatively to the rear wheel 44 of the first bicycle 12 when the device 10 is in use.

The first bar segment 168 bends integrally into a second bar segment 170 adapted to extend substantially rearwardly and downwardly relatively to the first bar segment 168 when the device 10 is in use. The second bar segment 170, in turn, bends integrally into a third bar segment 172. The third bar segment 172 is adapted to extend in a substantially horizontal direction and in an overlying relationship relatively to the fork tubes 62 of the second bicycle 14 when the device 10 is in use.

The length of the first bar segment 168 is such that it extends beyond the rear wheel 44 of the first bicycle 12 when the device 10 is in use. Similarly, the length of the third bar segment 172 is such that it extends beyond the distal end of the fork tubes 62 when the device 10 is in use. The length and the direction of the second bar segment 170 are such that the main tube of the second bicycle 14 will extend in a substantially horizontal direction when the device 10 is in use and the first bar segment 168 and the third bar segment 172 both extend in a generally horizontal direction.

As mentioned previously, one of the main features of the present invention resides in the presence of the wheel supporting means 90 for supporting the front wheel 38 of the second bicycle 14 in an inoperative position when the device 10 is in use. The wheel supporting means 90 is secured to the linking bar 80. The wheel supporting means 90 preferably takes the form of a wheel supporting plate 174 secured to the linking bar 80. Preferably, the wheel supporting plate 174 is secured to the bar first segment 168. The wheel supporting plate 174 has a plate outer peripheral edge 176. A plate slot 178 extends inwardly from the plate outer peripheral edge 176. The plate slot 178 is configured and sized so as to receive the axle 42 of the front wheel 38 of the second bicycle 14. The conventional locking mechanism used for locking the axle 42 to the distal end of the fork tubes 62 is adapted to be used for releasably locking the front wheel 38 to the wheel supporting plate 174 when the device 10 is used to pull the second bicycle 14. as illustrated in FIG. 1.

Although the wheel supporting plate 174 is preferably oriented so as to lie in a generally horizontal plane when the device 10 is in use, the wheel supporting plate 174 could be oriented differently without departing from the scope of the present invention. Also the wheel supporting means 90 could take a form other then that of a wheel supporting plate having a slot formed therein without departing from the scope of the present invention as long as the wheel supporting means provides a means for releasably supporting the front wheel 38 of the second bicycle 14 as the latter is being pulled by the linking bar 80. For example, the wheel supporting means 90 could take the form of an aperture extending transversally through the linking bar 80, the aperture being adapted to receive the axle 42.

As mentioned previously, another main feature of the present invention resides in the presence of the bar stabilizing means 92 for selectively stabilizing the device 10 on the first bicycle 12 when the device 10 is not in use and on the second bicycle 14 when the device 10 is in use. The bar stabilizing means 92 preferably includes a pair of stabilizing arms 180 that are pivotally attached to the linking bar 80 and a pair of stabilizing adapters 182 that are adapted to be fixed to the rear axle supporting plates 68 of the first bicycle 12.

Each stabilizing arm 180 has a generally elongated configuration defining an arm proximal end 184 and an opposed arm distal end 186. Each stabilizing arm 180 is preferably bent intermediate the arm proximal end 186 and the arm distal end 186 , thus defining an arm proximal segment 188 and an arm distal segment 190.

Each stabilizing arm 180 is pivotally attached adjacent its arm proximal end to the linking bar 180. The stabilizing arms 180 are preferably attached to an arm attachment block 192 that extends integrally from a lower surface of the liking arm 80 at the junction of the bar second segment 170 and the bar third segment 172. The stabilizing arms 180 are pivotally attached to the arm attachment block 192 by an arm proximal attachment pin 194 that extends through both the stabilizing arms 180 and the arm attachment block 192.

A plurality of arm adjustment apertures 196 extends through each arm distal segment 190. The arm adjustment apertures 196 are spaced apart and aligned relationship relatively to each other so as to provide an incremental adjustment means for the releasable attachment of the arm distal segments 190 to the stabilizing adapters 182 and to the fork tubes 62 of the second bicycle 14 as will be hereinafter disclosed.

A stabilizing arm attachment component 198, preferably of the quick-release type is mounted in one of the arm adjustment apertures of each arm distal segment 190. Each stabilizing arm attachment component 198 preferably includes an axle 200 having a cam lever assembly 202 mounted at a first longitudinal end thereof.

A nut assembly 204 having conventional compression washers mounted therein is adapted to be threadaly attached to the second longitudinal end of the axle 200 as is well known in the art. The axle 162 is inserted through one of the arm adjustment apertures 196.

As mentioned previously, the stabilizing adapters 182 are adapted to be fixed to the rear axle supporting plates 68 of the first bicycle 12. Each stabilising adapter 182 is preferably formed of a flat plate 212 having a generally arcuate configuration. Each stabilising adapter 182 has an adapter peripheral edge 206. Each adapter peripheral edge 206 is provided with an adapter notch 208 formed therein. Each adapter notch 208 is configured and sized to receive an axle 200 part of a stabilising arm attachment component 198.

Each stabilising adapter 182 is also provided with at least one and preferably two adapter fixing apertures 210 extending therethrough. The adapter fixing apertures 210 are preferably positioned opposite the adapter notch 208.

The rear axle supporting plates 68,70 of some conventional bicycles are provided with supporting plate apertures 212 extending therethrough. The supporting plate apertures 212 are typically provided to receive the distal end of supporting legs part of conventional bicycle luggage racks mounted over the rear wheel of conventional bicycles.

The stabilising adapters 182 are adapted to be secured to the rear axle supporting plates 68 of the first bicycle 12 by a set of adapter bolts 214 that extend through both the adapter fixing apertures 210 and the supporting plates apertures 212. The adapter bolts 214 are kept in place by conventional adapter lock-nuts 216.

As mentioned previously, the bar stabilising means 92 is provide for selectively stabilising the device 10 on the first bicycle 12 when the device 10 is not being used to pull the second bicycle 14 and for stabilising the device 10 on the second bicycle 14 when the device 10 is being used to pull the second bicycle 14.

More specifically, as illustrated in FIG. 1, when the device 10 is operatively being used to pull the second bicycle 14, each axle 200 part of the stabilising arm attachment components 190 is inserted into a corresponding fork end notch part of the fork tubes 62 of the second bicycle 14. The axles 200 are releasably secured in the fork end notches by the cam lever assembly 202 and the nut assembly 204 also part of the stabilising arm attachment components 198. The arm adjustment apertures 196 are adapted to allow for the adjustment of the stabilising arms 180 to various configurations and sizes of bicycles 12 and 14.

The stabilising arms 180 are thus adapted to stabilise the forked yoke 58 when the latter is no longer supported by the front wheel 38 that normally frictionnally engages the ground surface. Since the front wheel 38 is removed from the second bicycle 14 when the latter is being pulled, the forked yoke 58 would be loose if left unsupported by the front wheel 38.

A user sitting on the seat 78 would thus be unable to use the handlebar 66 for balance since the handlebar 66 would be free to rotate in all directions. One of the main functions of the stabilising means 92 is thus to stabilise the handlebar 66 when the front wheel 36 is removed during the pulling operation so that the handlebar 66 may be used for support by the person being pulled on the second bicycle 14.

When the device 10 is not being used to pull the second bicycle 14, the second bicycle attachment means 88 is not attached to the second bicycle 14 and, thus, the bar second longitudinal end 84 would drop if left unsupported. A second function of the stabilising means 92 therefore consists in stabilising and supporting the linking bar 80 when the latter is not attached to the second bicycle 14.

Figure 4:
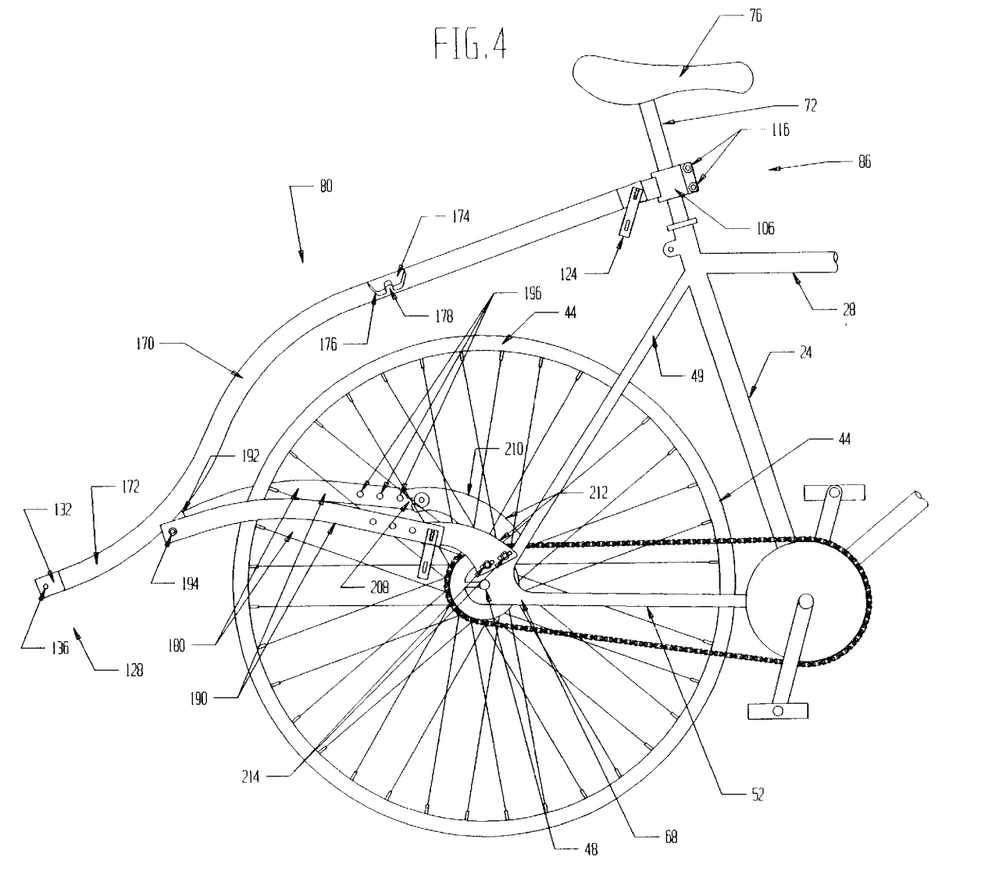
FIG. 4: in an elevational view with sections taken out, illustrates a coupling device in accordance with an embodiment of the present invention, the device being shown in a configuration wherein it is attached to a single bicycle and it is not being used to pull a second bicycle.

As illustrated in FIG. 4, when the linking bar 80 is not attached to the second bicycle 14, it is prevented from dropping onto the rear wheel 44 of the first bicycle 12 by the stabilising means 92. More specifically, the stabilising arms 180 are pivoted about the arm proximal attachment pin 194 so that the stabilising arm attachment component 198 attaches to the stabilising adapters 182 on the first bicycle 12 instead of the forked yoke 58 of the second bicycle 14.

Each axle 200 part of the stabilising arm attachment components 190 is inserted into a corresponding adapter notch 208. The axles 200 are releasably secured in the adapter notches 208 by the cam lever assembly 202 and the nut assembly 204 part of the stabilising arm attachment components 198. Again, the arm adjustment apertures 196 are adapted to allow for the adjustment of the stabilising arms 180 to various configurations and sizes of bicycles 12 and 14.

The embodiments of the invention in which an exclusive privilege or property is claimed are defined as follows:

1. A coupling device for coupling a second bicycle to a first bicycle, both said bicycles having front and rear wheels mounted on corresponding axles, both said bicycles also having a bicycle frame, each of said bicycle frames including a seat post, a handle bar, a forked yoke, a pair of rear axle supporting plates and a head tube, said coupling device comprising:

a linking bar, said linking bar having a generally elongated configuration defining a bar first longitudinal end and a bar second longitudinal end;

a first bicycle attachment means for pivotally attaching said linking bar to said first bicycle, said first bicycle attachment means being positioned adjacent said bar first longitudinal end;

a second bicycle attachment means for pivotally attaching said linking bar to said second bicycle, said second bicycle attachment means being positioned adjacent said bar second longitudinal end;

a wheel supporting means for releasably supporting the front wheel of said second bicycle, said wheel supporting means being positioned intermediate said bar first longitudinal end and said bar second longitudinal end;

whereby, when said device is coupling said second bicycle to said first bicycle, the front wheel of said second bicycle is removed from the latter and supported by said wheel supporting means; said wheel supporting means including a wheel supporting plate secured to said linking bar; said wheel supporting plate having a plate outer peripheral edge and a plate slot extending inwardly from said plate outer peripheral edge; whereby said plate slot is adapted to receive the axle of the front wheel of said second bicycle.

2. A coupling device as recited in claim 1 wherein said wheel supporting plate is positioned so as to lie in a generally horizontal plane when said coupling device is in use.

3. A coupling device for coupling a second bicycle to a first bicycle, both said bicycles having front and rear wheels mounted on corresponding axles, both said bicycles also having a bicycle frame, each of said bicycle frames including a seat post, a handle bar, a forked yoke, a pair of rear axle supporting plates and a head tube, said coupling device comprising:

a linking bar, said linking bar having a generally elongated configuration defining a bar first longitudinal end and a bar second longitudinal end;

a first bicycle attachment means for pivotally attaching said linking bar to said first bicycle, said first bicycle attachment means being positioned adjacent said bar first longitudinal end;

a second bicycle attachment means for pivotally attaching said linking bar to said second bicycle, said second bicycle attachment means being positioned adjacent said bar second longitudinal end;

a wheel supporting means for releasably supporting the front wheel of said second bicycle, said wheel supporting means being positioned intermediate said bar first longitudinal end and said bar second longitudinal end;

whereby, when said device is coupling said second bicycle to said first bicycle, the front wheel of said second bicycle is removed from the latter and supported by said wheel supporting means; said coupling device further comprising a stabilizing means for stabilizing the handlebar of said second bicycle when said linking bar is attached to said second bicycle and for supporting said linking bar when the latter is not attached to said second bicycle, said stabilizing means being mounted on said linking bar, said stabilizing means including a pair of stabilizing arms and a pair of stabilizing adapters, said stabilizing adapters being adapted to be attached to the rear axle supporting plates of said first bicycle; each of said stabilizing arms having a generally elongated configuration defining an arm proximal end and an arm distal end, each of said stabilizing arms being pivotally attached adjacent said arm proximal end to said linking bar, each of said stabilizing arms being provided with an arm attachment means adjacent said arm distal end for selectively attaching said arm distal end to the forked yoke of said second bicycle and to one of said stabilizing adapters.

4. A coupling device as recited in claim 3 wherein each of said arm attachment means includes

- at least two adjustment apertures extending through said arm distal segment, said adjustment apertures being in a spaced apart and aligned relationship relatively to one another;
- a stabilizing arm attachment component mounted in one of said adjustment apertures, said stabilizing arm attachment component including
  - an attachment axle extending through said one of said adjustment apertures,
  - a cam lever assembly mounted at a first end of said attachment axle,
  - a nut assembly mounted at a second end of said attachment axle.

5. A coupling device for coupling a second bicycle to a first bicycle, both said bicycles having front and rear wheels mounted on corresponding axles, both said bicycles also having a bicycle frame, each of said bicycle frames including a seat post, a handle bar, a forked yoke, a pair of rear axle supporting plates and a head tube, said coupling device comprising:

- a linking bar, said linking bar having a generally elongated configuration defining a bar first longitudinal end and a bar second longitudinal end;
- a first bicycle attachment means for pivotally attaching said linking bar to said first bicycle, said first bicycle attachment means being positioned adjacent said bar first longitudinal end;
- a second bicycle attachment means for pivotally attaching said linking bar to said second bicycle, said second bicycle attachment means being positioned adjacent said bar second longitudinal end;
- a stabilizing means for stabilizing the handlebar of said second bicycle when said linking bar is attached to said second bicycle and for supporting said linking bar when the latter is not attached to said second bicycle, said stabilizing means being mounted on said linking bar;
- said stabilizing means including a pair of stabilizing arms and a pair of stabilizing adapters, said stabilizing adapters being adapted to be attached to the rear axle supporting plates of said first bicycle; each of said stabilizing arms having a generally elongated configuration defining an arm proximal end and an arm distal end, each of said stabilizing arms being pivotally attached adjacent said arm proximal end to said linking bar, each of said stabilizing arms being provided with an arm attachment means adjacent said arm distal end for selectively attaching said arm distal end to the forked yoke of said second bicycle and to one of said stabilizing adapters.

6. A coupling device as recited in claim 5 wherein each of said arm attachment means includes

- at least two adjustment apertures extending through said arm distal segment, said adjustment apertures being in a spaced apart and aligned relationship relatively to one another;
- a stabilizing arm attachment component mounted in one of said adjustment apertures, said stabilizing arm attachment component including
  - an attachment axle extending through said one of said adjustment apertures,
  - a cam lever assembly mounted at a first end of said attachment axle,
  - a nut assembly mounted at a second end of said attachment axle.

* * * * *